No. 684,962.  Patented Oct. 22, 1901.
S. L. WALKER & F. W. WILSON.
AUTOMATIC COUPLING FOR RAILWAY VEHICLES.
(Application filed June 7, 1901.)
(No Model.)  2 Sheets—Sheet 1.
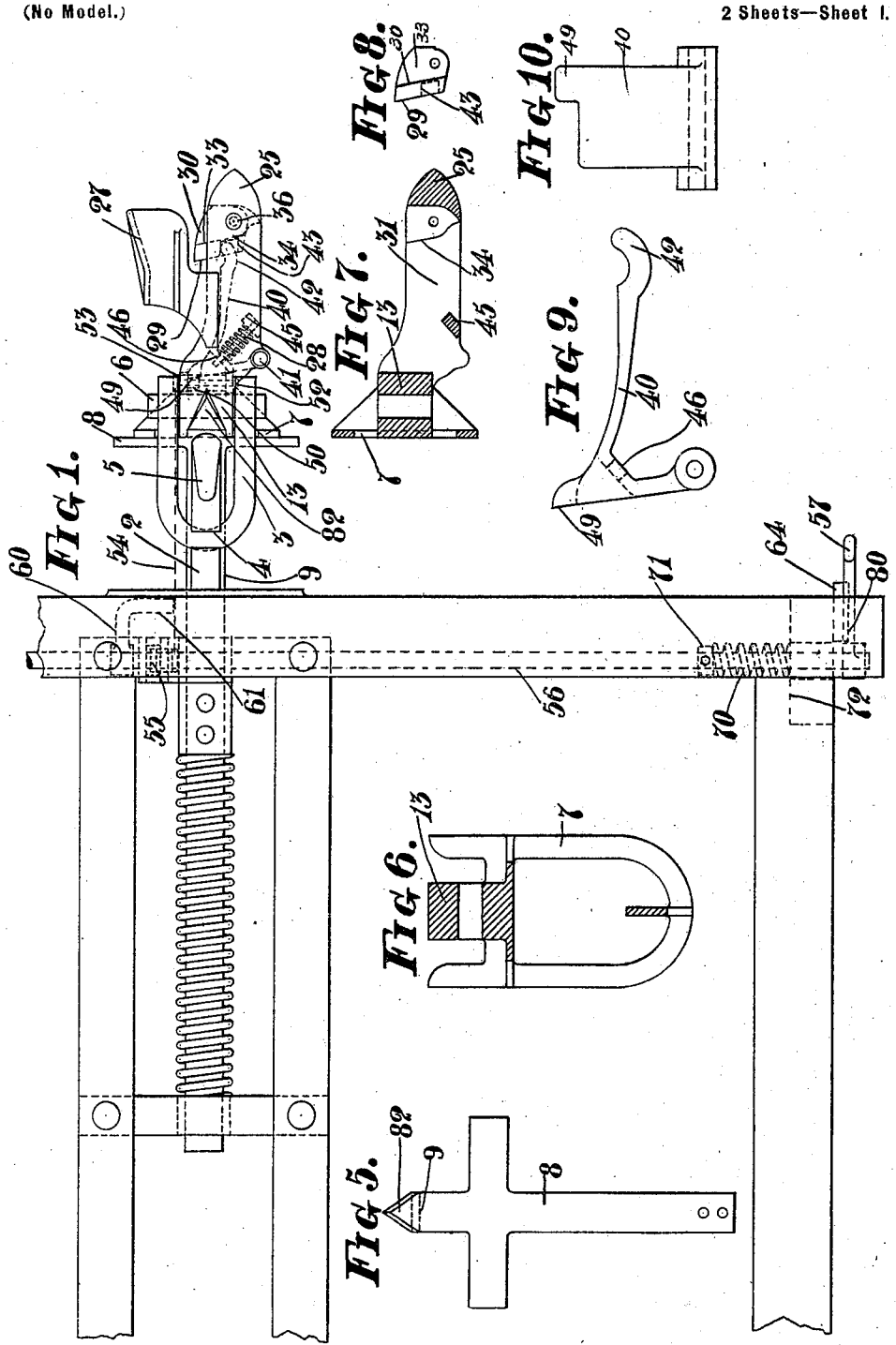
WITNESSES:
INVENTORS.
ATTORNEYS.

No. 684,962. Patented Oct. 22, 1901.
S. L. WALKER & F. W. WILSON.
AUTOMATIC COUPLING FOR RAILWAY VEHICLES.
(Application filed June 7, 1901.)
(No Model.) 2 Sheets—Sheet 2.
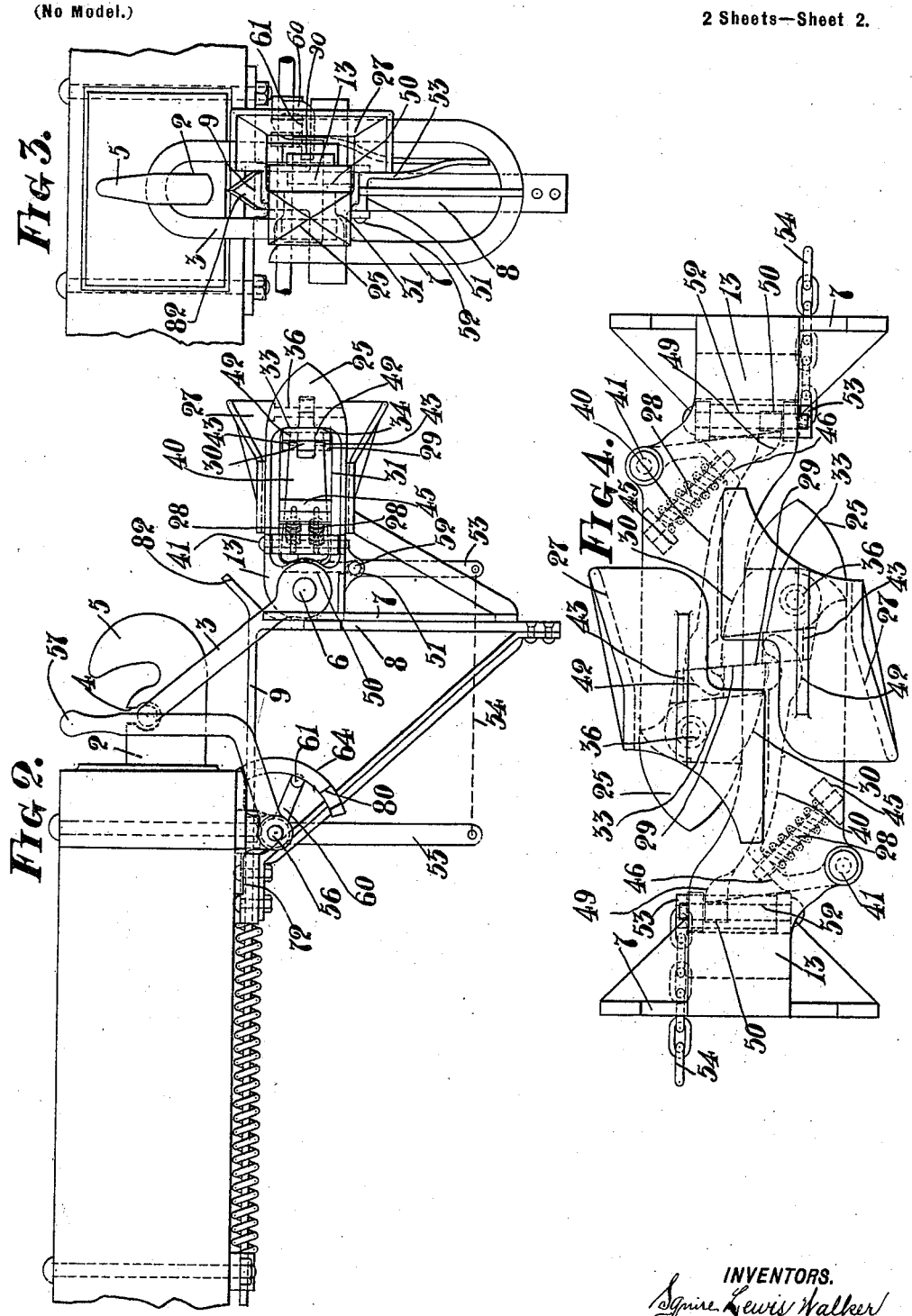
WITNESSES:
INVENTORS.
Squire Lewis Walker
Frederick William Wilson
ATTORNEYS.

UNITED STATES PATENT OFFICE.

SQUIRE LEWIS WALKER AND FREDERICK WILLIAM WILSON, OF BRADFORD, ENGLAND.

AUTOMATIC COUPLING FOR RAILWAY-VEHICLES.

SPECIFICATION forming part of Letters Patent No. 684,962, dated October 22, 1901.

Application filed June 7, 1901. Serial No. 63,626. (No model.)

*To all whom it may concern:*

Be it known that we, SQUIRE LEWIS WALKER, residing at 54 Robert street, and FREDERICK WILLIAM WILSON, residing at 154 Gladstone street, Bradford, England, subjects of the King of England, have invented a certain new and useful Improvement in Automatic Couplings for Railway-Vehicles, of which the following is a specification.

This invention relates to automatic couplings for railway-vehicles.

In the accompanying drawings, Figure 1 represents a plan view of the end of such parts of the under frame of a railway-truck as are necessary to illustrate the application of our improvements. Fig. 2 is a side elevation of the same, and Fig. 3 is a front view of the center part. Fig. 4 is a separate plan view, on a larger scale, of a pair of our improved couplings. Figs. 5 to 10 are views of detail hereinafter referred to.

When the vehicle is fitted with the ordinary hook 2, we mount the shackle or link 3 in the eye 4 in the hook in place of the ordinary coupling-chain. The part 5, projecting beyond the eye 4, can of course be omitted if it is not desired to couple the vehicle to another provided with the ordinary chain coupling only.

The coupling-head 13 is pivoted to the free end of the shackle 3 by the pin 6 and a U-shaped downward extension 7, which bears upon the vertical bed 8 on the end of the horizontal slide 9 and holds the coupling-head horizontal, as shown in Fig. 2. Fig. 5 is a separate front view of the vertical bed, and Fig. 6 is a separate cross-section of the U-shaped extension.

The head 13 lies a little way out of the center of the truck, and its end 25 is beveled off from all sides to a point, and beyond this beveled part nearer to the vehicle the socket 27 is provided to engage the end of the coupling of the adjoining vehicle. The sockets are made more or less bell-mouthed, so as to guide the beveled ends of the adjoining coupling in. The vertical meeting faces of the couplings are each fitted with inclined catches 30, lying in recesses 31 in the heads. The catches are forced inward to pass each other when the couplings engage and are forced outward by internal springs 28, operating the intermediate lever, hereinafter referred to. The vertical meeting faces 29 of the catches are preferably more or less undercut to prevent any possibility of them accidentally parting. The catches 30 are made with shoulders 33 to engage projections 34 in the recesses in which they lie to prevent them coming out too far, and the catches preferably bear bodily upon the interior of the recesses to relieve the strain upon their pivots 36.

Fig. 7 is a horizontal section of one of the coupling-heads, and Fig. 8 is a separate plan view of one of the catches.

To uncouple the couplings, either of the catches is forced aside to clear the other by the intermediate lever 40 engaging each catch. The lever 40 is pivoted on the pin 41 and lies in the recess 31 in the coupling-head. Its free end is forked, and the ends 42 of the fork engage the two recesses 43 in the catch 30. Springs 28, compressed between the bar 45, crossing the recess 31 and the part 46 of the lever 40, are provided to normally hold the catch of each head in the engaging position. Fig. 9 is a separate plan view of the lever 40, and Fig. 10 is a rear view of the same. To uncouple the catches, a lug 49 is provided on the lever 40 to engage the arm 50 of the lever 51, pivoted on the pin 52. The lever 51 has a pendent arm 53, coupled by the chain 54 to the arm 55, loosely mounted upon the cross-shaft 56, having a hand-lever 57 at each end. The arm 55 is loosely mounted upon the shaft 56, so as to allow it to swing forward and follow the lever 51 when the shackle 3 is stretched out horizontally by the application of tension to the coupling. An arm 60 is rigidly fixed to the shaft 56 and having its end 61 bent over into such a position that when moved to the required degree it engages the arm 55 and operates it to disengage the catches. When, however, the hand-levers are in the position shown, the end 61 of the arm 60 is sufficiently far away from the arm 55 to allow of the free movement of the latter.

To hold the levers 57 down and keep the catch operated thereby in the disengaged position, the quadrant-piece 64 is provided at one side of the vehicle for the side of the lever at that side to bear against it. A spiral spring 70, compressed between the collar 71 on the shaft 56 and the bearing 72 for such shaft 56, draws the lever 57 at that side against the quadrant with sufficient force to prevent any tendency for the hand-levers to move, excepting when operated by hand. A shoulder 80 may be provided at one or both ends of the quadrant to engage the hand-lever, so that it is necessary to move the shaft longitudinally before the hand-levers can be moved.

To facilitate centralizing the coupling as it is lowered back against the bed 8, the wedge of V-shaped projection 82 is provided above the bed 8 to engage the shackle 3 as the coupling descends.

We claim—

1. In combination with the draw-bar, a coupling-head having a socket to direct the meeting head to place, a shackle pivoted to the draw-bar and to the rear end of the head, said shackle being of a length to permit it and the head to lie in the same horizontal plane when under tension, said head lying when uncoupled in a horizontal plane below the plane of the draw-bar and rising to the plane of the draw-bar when under tension, an extension on said head reaching vertically downward, a vertical bed-plate 8 and a horizontal slide carrying the same, substantially as described.

2. The combination with the recessed coupling-head and the catch 30 of the intermediate lever 40 a spring for pressing the lever to exert a pressure on the catch the lever 51 and means for operating it to disengage the catch, said catch 30 and lever 40 being arranged within the recess of the head substantially as herein shown and described.

3. In combination with the draw-bar, a coupling-head, a shackle pivoted to the draw-bar and to the rear end of the head, said head when uncoupled lying in a plane below the plane of the draw-bar and adapted to be raised by the pull of the train, a catch carried by the coupling-head, a shaft 56, an arm 55 loosely mounted on the said shaft, a lever for operating the shaft, a connection between said loose arm 55 and the catch on the draw-head and a projection rigid on the shaft 56 for operating the arm 55, said projection standing normally away from the arm 55 to allow said arm to swing forward freely when the coupling-head is drawn up from its lower position, substantially as described.

4. In combination, a coupling-head, a vertical bed 8 forming a bearing for a part of said head, said bed having a V-shaped projection 82, and a shackle 3 for holding the coupling-head, said projection 82 being arranged to engage said shackle, substantially as described.

In witness whereof we have hereunto set our hands in presence of two witnesses.

SQUIRE LEWIS WALKER.
FREDERICK WILLIAM WILSON.

Witnesses:
DAVID NOWELL,
SAMUEL DRACUP.